April 15, 1930.  R. C. BRICE  1,755,048
INFLATABLE BAG FOR USE IN TIRE BUILDING
Filed Oct. 19, 1928
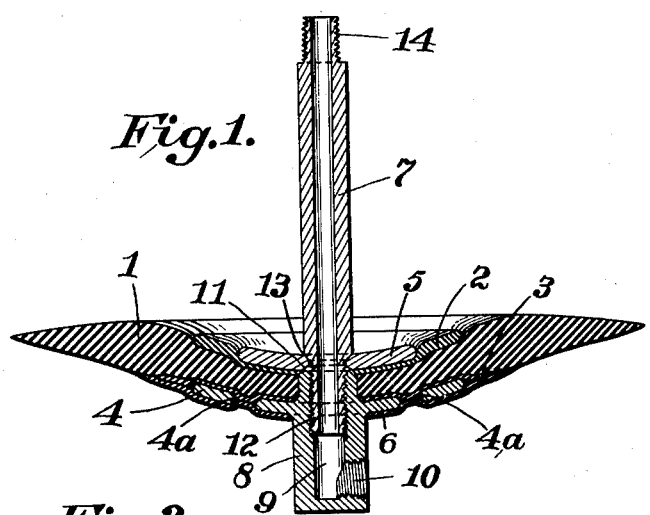
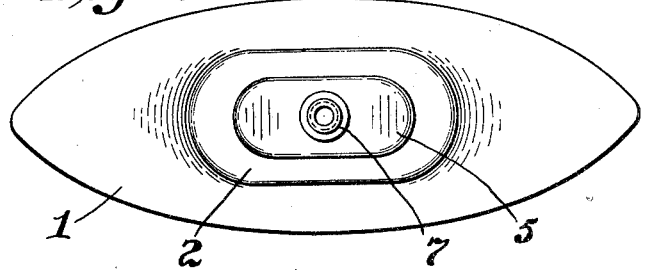
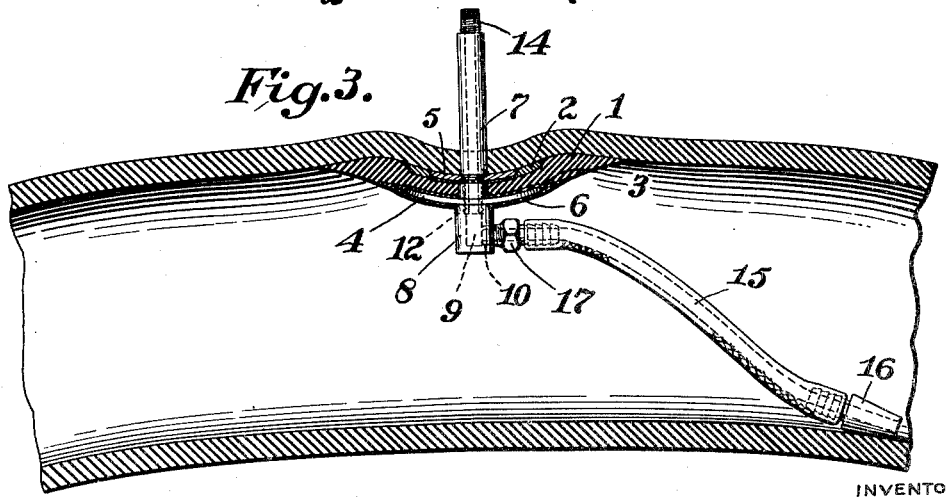
INVENTOR:
Roy Cotton Brice,
BY
ATTORNEYS.

Patented Apr. 15, 1930

1,755,048

UNITED STATES PATENT OFFICE

ROY COTTON BRICE, OF AKRON, OHIO, ASSIGNOR TO THE MILLER RUBBER COMPANY, OF AKRON, OHIO, A CORPORATION OF OHIO

INFLATABLE BAG FOR USE IN TIRE BUILDING

Application filed October 19, 1928. Serial No. 313,605.

This invention relates to improvements in bags having inflating tubes and adapted to be filled with fluid for use in tire building.

An object of the invention is to provide a readily removable inflating stem which, if damaged, may be quickly replaced.

A further object is to provide an inflating tube pad of novel construction within the bag and firmly secured thereto.

Another object is to provide means whereby the bag may be used as a water bag for use in tire building.

Other objects will appear hereinafter.

The invention consists in the features, combination, and arrangement of parts hereinafter described and particularly pointed out in the claims.

In the drawings:

Fig. 1 is a sectional view of the inflating stem pad with the inflating tube therein.

Fig. 2 is a plan view of Fig. 1.

Fig. 3 is a sectional view of the bag with the pad and inflating stem with its ferrule therein and adapted for use as a water bag.

Referring to the drawings, 1 represents the rubber pad which is molded from a vulcanizable rubber compound and partially vulcanized.

The rubber pad 1 is preferably of elliptical contour molded so as to be thickest at the center and tapering out to a thin edge, and having a central hole for the valve stem or inflating stem 7.

After being molded and partially vulcanized, this article is buffed all over and dipped in a rubber cement. Unvulcanized cushion pieces of vulcanizable rubber compound 2 and 3 are then applied on opposite sides of this article and the metal parts of the inflating tube or valve are assembled and rubber parts 1, 2 and 3 are brought under compression.

The inflating tube comprises the metal ferrule portion 8 having a central bore 9 and preferably closed at its lower end and provided with a lateral screw threaded opening 10. The ferrule bore 9 is screw threaded at its upper end to receive the externally screw threaded lower end 12 of the inflating stem 7. The ferrule is provided with an integral flange 4 preferably curved upwardly and outwardly, as shown, and having apertures 4ª therein. The upper end 11 of the ferrule tapered to receive the internally tapered bore of the upper metal washer or loose flange member 5. The bore of the washer 5 has a reverse taper at its upper end to receive the correspondingly tapered shoulder 13 of the stem 7.

In assembling, the ferrule 8 is inserted through the hole in the pad 1 and cushions 2 and 3, with the lower flange 4 engaging the lower side of the cushion 3.

The stem 7 is then screwed into the bore 9 with the washer 5 between it and the ferrule and when the washer 5 is clamped between shoulder 13 and the upper end 11 of the ferrule, the rubber pad and cushions are clamped and compressed between the upper loose flange or washer 5 and the lower integral flange 4 of the ferrule.

The lower flange 4 is, prior to assembly, coated with rubber cement, but the flange or washer 5 is not cemented.

After the rubber parts 1, 2 and 3 have been compressed at the center by screwing the metal parts together, the layer of rubber 6 is applied over the lower flange 4, the rubber parts 3 and 6 meeting at their outer edges and also through the apertures 4ª to form an effective interlock. The assembled valve pad is then given a coat of cement and allowed to dry preparatory to being built into the bag.

The upper end 14 of the stem 7 is screw threaded to receive a suitable connection for filling the bag with fluid such as air or water under pressure.

The lateral aperture 10 is internally screw threaded for the reception of a flexible hose connection 15 weighted at its free end at 16 to remove the water where water is the fluid used to fill the bag in the tire building process.

The flexible hose 15 comprises a nipple 17 at one end for connection in the aperture 10 and a weighted nozzle member 16 at the other end.

In the use of the water bag in building tires, when the cure is complete, the water in the bag flashes to steam upon release of pressure and blows the water from the bag through the hose 15 and the inflating tube, the removal of the water being insured by the weighted end of the flexible hose connection 15.

The bag is built with the assembled valve pad therein. The bag may be formed by the extruding method or by being built up on a mandrel.

In the extruding method, a rubber tube of the proper dimensions for the bag is formed on an extruding machine. It is then cut to length and one end is skived on the inside and the other end is skived on the outside. A hole for the stem is punched through the wall of the tube near one end. The inside of the tube near this hole, which is for the stem, is then benzined to free it from all soapstone and the assembled inflating tube and pad is inserted through the end of the tube and pushed out through the hole and into intimate contact with the tube wall. The ends of the rubber tube are then spliced together and the bag is placed in a mold and inflated with air to bring it in contact with the mold, where vulcanization takes place.

The other method is similar, except that the rubber tube is built up of successive plies wrapped around a mandrel, instead of being formed on an extruding machine.

After the air bag is built, should the stem 7 become damaged at any time, it may be unscrewed from the part 8—4, and the part 4 being anchored into the rubber of the bag by the layer of rubber 6 is unable to loosen and drop into the bag, so that when a new stem 7 is screwed in place no difficulty is experienced in joining the two metal parts. While the part 5 eventually is entirely imbedded in rubber, no caution is exercised to insure its adhering to the rubber. The part 4 before assembling is preferably pickled in acids to roughen its surface, and then given a coat of cement so that the rubber will vulcanize to the metal.

The air bags, in order to be efficient, must be manufactured from a very pure compound of rubber, which is very expensive. The present valve stem is designed to overcome objections found in stems previously used, and while it is very simple in construction, it has solved the problem and enabled the manufacturer to remove the broken or damaged stem and replace it with a new one without cutting into the bag, or destroying it.

While the stem is herein referred to as a valve stem, it will be understood that it ordinarily contains no valve means but simply provides an inflating stem to which suitable pipe lines are connected at 14, in order to provide a compression of air, water, or other fluid to the inside of the bag during the entire period of vulcanization of the tire.

I claim:

1. A bag for containing fluid for use in tire building, comprising a hollow flexible body, a pad of rubber vulcanized to the inner face of said body, an internally threaded ferrule located in an opening in said pad, clamping plates carried by said ferrule on opposite sides of the pad, and an inflating stem passing through an opening in the body and detachably engaging said ferrule.

2. A bag for containing fluid for use in tire building comprising a hollow flexible body, a pad of rubber vulcanized to the inner face of the body, a ferrule located in an opening in said pad, said ferrule having an integral plate extension overlying the inner face of the pad, a plate overlying the outer face of the pad and between it and the body and having an opening aligning with the bore of the ferrule, and an inflating stem passing through an opening in the body, and having a threaded end portion engaging the bore of the ferrule and having also a shoulder engaging said overlying plate.

3. A bag for containing fluid for use in tire building comprising a hollow flexible body, a pad of rubber within said body having rubber cushions on its opposite faces, an internally threaded ferrule located in an opening in said pad, retaining plates for said ferrule imbedded in said cushions, said pad and its overlying cushion being vulcanized to the inner surface of the body, and the cushions vulcanized to the pad, and an inflating stem passing through an opening in the body and having a threaded end portion detachably engaging said ferrule.

4. A bag for containing fluid for use in tire building comprising a hollow flexible body, a pad of rubber within said body, an internally threaded ferrule located in an opening in the pad and having an integral plate extension overlying the inner face of the pad, a plate member overlying the outer face of the pad and having an opening aligning with the bore of the ferrule, rubber cushions located between the pad and its opposed plate members, an inflating stem passing through an opening in the body and having a threaded end portion detachably engaging the bore of the ferrule and having a shoulder engaging the overlying plate member, said pad and cushions being vulcanized together and to the inner face of the body.

5. A bag for containing fluid for use in tire building, comprising a hollow flexible body, a pad of rubber within said body having rubber cushions on its opposite faces, an internally threaded ferrule located in an opening in said pad, retaining plates for said ferrule engaging said cushions on the opposite sides of the pad, said pad and its overlying cushion being vulcanized to the inner surface of the body, and the cushions vulcanized to the pad, an inflating stem passing through an opening in the body and having a threaded end portion detachably connected to said ferrule, and a rubber retaining cushion vulcanized to the lower cushion and enclosing the inner retaining plate therebetween.

6. A bag for containing fluid for use in tire building, comprising a hollow flexible body, a pad of rubber within said body having rubber cushions on its opposite faces, said pad having a central opening, an internally threaded ferrule located in said opening, said ferrule having an integral plate member extending therefrom and engaging the lower face of the lower cushion, a plate engaging the upper face of the upper cushion and having a bore aligning with and engaging the upper end of said ferrule, an inflating stem passing through an opening in the body and through said plate and having a threaded end detachably connected to said ferrule, and having a shoulder engaging said upper plate, a rubber retaining member overlying the under side of the integral plate member and vulcanized to said lower cushion and pad, said pad and cushions being vulcanized together and to said body.

7. A bag according to claim 6 in which the said integral plate member of said ferrule is provided with apertures to permit the rubber cushions which envelop it, to interlock therethrough when vulcanized to securely hold the ferrule in place in the pad.

8. A bag according to claim 6 in which said ferrule is closed at its lower end and provided with a lateral screw threaded aperture, a flexible hose connection having a screw threaded nipple engaging said aperture and having a free end provided with a weighted nozzle.

9. A bag according to claim 6 in which said upper plate member is clamped between a downwardly tapering shoulder on said stem, and an upwardly tapering shoulder on said ferrule.

In testimony whereof I affix my signature.

ROY COTTON BRICE.